J. T. COSTELLO.
PLUMBING TRAP.
APPLICATION FILED SEPT. 3, 1908.
941,062. Patented Nov. 23, 1909.
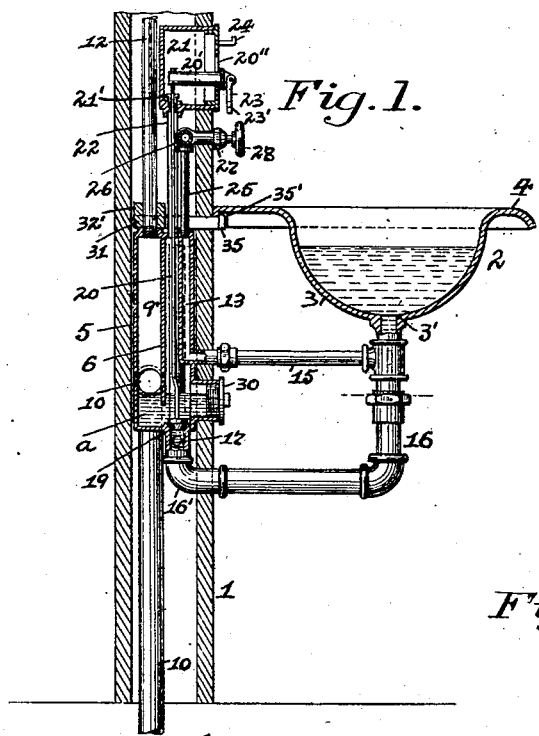
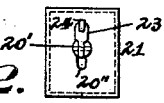
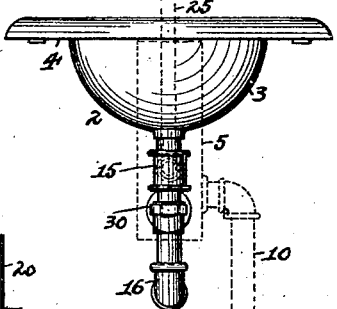
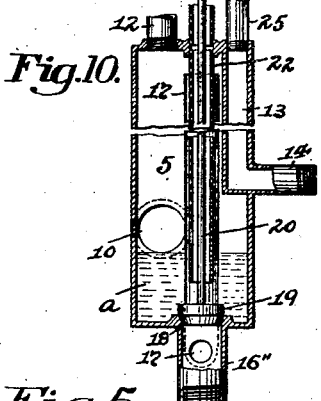
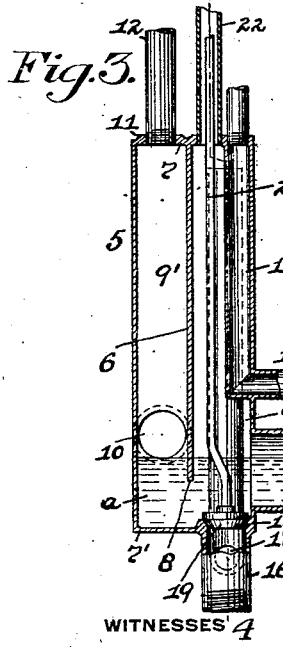
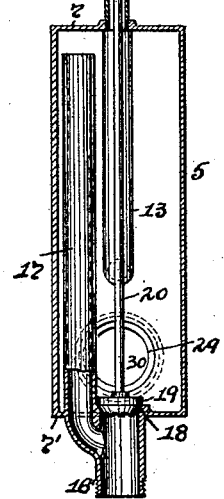
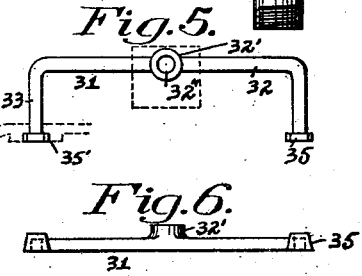
WITNESSES
Walter Jamariss
O. L. Thompson.
INVENTOR
John T. Costello
By J. N. Cooke
Attorney.

UNITED STATES PATENT OFFICE.

JOHN T. COSTELLO, OF PITTSBURG, PENNSYLVANIA.

PLUMBING-TRAP.

941,062.  Specification of Letters Patent.  Patented Nov. 23, 1909.

Application filed September 3, 1908. Serial No. 451,488.

*To all whom it may concern:*

Be it known that I, JOHN T. COSTELLO, a resident of Pittsburg, in the county of Allegheny and State of Pennsylvania, have invented a new and useful Improvement in Plumbing-Traps; and I do hereby declare the following to be a full, clear, and exact description thereof.

My invention relates to plumbing traps, and has special reference to a trap for use in connection with wash-stands, tubs, sinks and other similar articles.

The object of my invention is to provide a trap which will be cheap, simple and efficient in its form and operation, will do away with the formation of cored openings for the water supply pipes in the stand, tub, etc., and will provide for what is known as a perfect "roughing in" job in setting up the trap.

My invention consists, generally stated, in the novel arrangement, construction and combination of parts, as hereinafter more specifically set forth and described, and particularly pointed out in the claims.

To enable others skilled in the art to which my invention appertains to construct and use my improved trap, I will describe the same more fully, referring to the accompanying drawing, in which—

Figure 1 is a vertical central section of my improved trap showing the same applied to a wash-stand and with some of the parts in full lines. Fig. 2 is a front view of the same. Fig. 3 is an enlarged vertical section of the trap. Fig. 4 is a like section of the same taken on the line 4—4 Fig. 3. Figs. 5, 6, 7 and 8 are detail views showing the manner of supporting the stand in place. Figs. 9 and 10 are modifications of the device.

Like symbols of reference herein indicate like parts in each of the figures of the drawing.

As illustrated in the drawing, 1 represents the usual wall of a building and 2 is a wash-stand of any approved construction having the bowl 3 and rim 4 around the upper portion of the same. Within the wall 1 is the trap 5, which is preferably formed of cast metal and of box-shape having a partition wall 6 extending centrally and vertically from the upper end 7 of the same to within a short distance of the lower end 7' to form the space 8 under the same. The partition 6 forms the chambers 9 and 9' on each side of the same and leading down within the wall 1 from the rear chamber 9' and above the lower end of said partition and space 8 is the waste or escape pipe 10 from the trap 5. Connected to the upper end 7 of the trap 5 and through a boss 11 thereon is the vent pipe 12, which communicates with the chamber 9' and extends up within the wall 1 to the atmosphere in the ordinary manner.

Cored out of the front side of the trap 5 and within the chamber 9 is the supply passageway 13, which has an elbow portion 14 thereon for extending through the wall 1 and for being connected to the supply pipe 15 for the stand 2. Leading from and connected at one end to the usual opening 3' in the bottom of the bowl 3 is the usual waste pipe 16, to which the pipe 15 is connected and which acts as a combined supply and waste pipe. The other end of the pipe 16 leads into the bottom of the trap 5 through an elbow 16' connected thereto which passes through the wall 1 and through an extension 16" on the end 7' to which such elbow is connected. An overflow pipe 17 leads from one side of the extension 16" and up within the chamber 9 of the trap 5 and its upper end opens within a short distance of the upper end 7 of said trap.

A seat 18 is formed in the lower end 7' of the trap and over the opening formed by the extension 16" thereon, and a plug 19 is adapted to engage therewith and be operated through a rod 20 which is connected thereto and extends up through the chamber 9 and into a box 21 supported in the front portion of the wall 1. The rod 20 passes through a pipe 22 which is connected to the upper end 7 of the trap 5 and to the lower end of the box 21, as well as passing through a stuffing box 21' on said box end, and a bar 20' is connected to the upper end of said rod and passes through an opening 20" in the front wall of said box. A locking or operating plate 23 is pivoted to the outer end of the bar 20' and is provided with a hole 23' in the same for engaging with a hook pin 24 extending out from the upper portion of said box and above the opening 20".

Connected to the upper end 7 of the trap 5 and communicating with the passage-way 13 in said trap is the main supply pipe 25, which leads up from said trap and is provided with the usual branch pipes 26 at the upper end of the same. These two branch pipes 26 have the usual faucets 27 at their ends which extend through the front portion of the wall 1, and are preferably provided with the hand wheels 28 at their outer ends for operating the same to supply hot or cold water to the pipe 25, as desired, from the main or other supply pipes (not shown) in the wall 1 and leading into said faucets.

A projecting portion or extension 29 is formed on the front of the trap 5 and at the lower end of the same, which extends through the front portion of the wall 1 and is provided with a screw-cap 30 at its outer end for enabling the cleaning out of the said trap, when desired.

Extending around the vent pipe 12 and against the boss 11 on the upper end 7 of the trap 5 is the U-shaped bracket 32 for locating and supporting the stand 2, which has a hole 32″ in a base 32′ on its body portion 32 for fitting around said pipe. The arms 33 on the bracket 31 extend through the front portion of the wall 1 and are adapted to pass through openings 34 in the rim 4 on said stand so that dovetailed lugs 35 on the ends of the arms 33 can fit within dovetailed seats 35′ on the rim 4 of the stand 2 and support said stand in position.

As the wall 1 is formed or built up, the trap 5 is set within the same and when the wall is completed at such point, the trap has the escape pipe 10 and vent pipe connected thereto, and with bracket 31 and the operating parts of the trap in position for use, the said trap is ready for its being connected up to the stand 2, which is accomplished in the following manner. The stand 2 is connected to the bracket 31 set in position on the trap 5 and around the vent pipe 12 by dropping the same, so that the openings 34 in the rim 4 on said stand pass over the arms 33 on said bracket and allow the lugs 35 to fit within the seats 35′ on said rim. The stand 2 is now ready and in position for waste pipe 16 to be connected to the elbow 16′ on the trap 5 extending through the front portion of the wall 1 from the extension 16″ on said trap, and the supply pipe 15 to be connected to the elbow 14 on the passage-way 13 extending through said wall portion, after which the pipe 15 can be connected to the waste pipe 16 and said pipe 16 connected to the opening 3′ in the stand bowl 3.

The use and operation of my improved plumbing trip are as follows: By opening one or both of the faucets 27 through the handle or handles 28, the water will pass from the main supply pipe or pipes to the pipe 25 through the branch pipe or pipes 26 and thence down through the passage-way 13 in the trap 5 into the bowl 3 through the pipes 15 and 16. In case of any overflow in the bowl 3, the water will pass down through the pipe 16 and into the overflow pipe 17 in the trap 5, after which it will flow out the top of said pipe 17 into the chamber 9 of said trap, and then enter the water seal $a$ formed in the bottom of said trap by the partition 6 therein and below the opening in said trap to the escape pipe 10, so that any excess of water formed thereby in said seal can enter said opening and pass away through the said pipe 10. After the supply of water to the bowl 3 has been shut off, the water within said bowl can be emptied from the same by raising the plug 19 from its seat 18 through lifting of the rod 20 connected thereto and bar 20′ connected to said rod, so that these parts can be thus held in these positions by hand through said bar or by turning the plate 23 on said bar and allowing it to engage with the hook pin 24 through the hole 23′ in said plate, thereby holding said parts in said positions. By thus raising the plug 19, the water within the bowl 3 will pass down and through the waste pipe 16, around the plug 19 and into the seal $a$ in the trap where any excess of water formed thereby can enter said opening and pass away through the escape pipe 10.

When it is desired to clean the seal $a$ and pipe 16, the plug 10 can be raised and a cloth or other cover placed over the opening 3′ to said pipe in the bowl 3, so that with the water turned on, the clean or fresh water will pass from the pipe 15 through the pipe 16 and out through the escape pipe 10. After the waste water in the bowl 3 has passed out the trap 5 through the pipe 16, the fresh or clean water remaining in the pipes 25, 26, passage-way 13 and pipe 15, will seep or drip through the pipe 16 and further aid in cleaning the seal $a$ of the trap 5.

If desired, the overflow pipe 17 can carry the plug 19 at the lower end, and the rod 20 connected to the upper end of the same, as shown in Fig. 9, so that by lifting on said rod the pipe and plug will be raised with the same, and if desired the partition 6 can be dispensed with, and in such case the pipe 22 can extend through the upper end 7 of the trap 5 and into the water forming the seal $a$ at the lower end of said trap, as shown in Fig. 10, while various other modifications and changes in the design and operation of my improved plumbing trap may be resorted to without departing from the spirit of the invention or sacrificing any of its advantages.

It will thus be seen that in the use of my improved trap the supply and waste to and from the stand, tub, sink, etc., take place at a single opening therein, which is generally termed the waste opening, and through what is known as the waste pipe, thereby doing away with the trouble and expense of forming cored openings in the fixture or article for the supply pipes, and at the same time overcoming the necessity of fitting up such pipes to the article, which is troublesome and expensive by reason of the pipes being out of alinement or requiring cutting off, etc.

It will also be seen that my improved trap when in use will provide for positive connections, will be sanitary in all respects, and will provide for a complete "roughing in" job in every way, while at the same time the plug will be in the trap instead of in the article, and all parts are completely covered up when in use.

When the trap is used with a wash-stand, such stand can be gaged and positioned for being connected to the trap, easily and quickly, and will not require the use of rigid and expensive connections for the same, while the overflow being in the trap will do away with the use of a cored overflow in such stand, which is expensive and troublesome to make and is very unsanitary, by reason of its collecting dirt and slime and allowing foul air to escape therefrom into the room or apartment in which it is used.

It will also be obvious that all the parts pertaining to the stand or fixture are in one perfect position to receive such fixture and are located in the wall or partition in the rough of a building, while the trap will necessitate the control of the supply pipe and by so doing allow a combined supply and waste pipe connection, so that this connection compels the plug or stopper for the fixture to be placed beyond such fixture and in a trap in connection with the overflow in such trap for such fixture, thereby providing a trap which has the overflow or part of the fixture in the same and forming a trapped overflow. The overflow is water sealed and sanitary by being located in the trap and not in the fixture and the plug or stopper being located in the trap and not in the fixture enables full control from the wall 'pull to operate the same. The trap screw or cap is sealed or trapped by the water in the trap and through the partition in said trap, and such trap can be easily cleaned through the opening closed by said cap.

What I claim as my invention and desire to secure by Letters Patent, is—

1. The combination with a wash-stand or other hollow plumbing fixture having an opening therein, of a waste pipe connected to said opening, a supply pipe leading into said waste pipe, and a trap connected to the waste pipe for the discharge of the water from the fixture through said waste pipe, and having said supply pipe passing through said trap.

2. The combination with a wash-stand or other hollow plumbing fixture having an opening therein, of a waste pipe connected to said opening, a supply pipe leading into said waste pipe, a trap connected to the waste pipe for the discharge of the water from the fixture through said waste pipe, and means within said trap for opening and closing said waste pipe, and having said supply pipe passing through said trap.

3. The combination with a wash-stand or other hollow plumbing fixture having an opening therein, of a waste pipe connected to said opening, a supply pipe leading into said waste pipe, a trap connected to the waste pipe for the discharge of the water from the fixture through said waste pipe, and a plug within said trap for opening and closing said waste pipe.

4. The combination with a wash-stand or other hollow plumbing fixture having an opening therein, of a waste pipe connected to said opening, a supply pipe connected to said waste pipe, a trap connected to said waste pipe for the discharge of the water from the fixture through said waste pipe, and a plug within said trap having a rod connected thereto and passing through said trap for operating said plug in opening and closing said waste pipe.

5. The combination with a wash-stand or other hollow plumbing fixture having an opening therein, of a waste pipe connected to said opening, a supply pipe connected to said waste pipe, a trap connected to said waste pipe for the discharge of the water from the fixture through said waste pipe, a plug within said trap having a rod connected thereto and passing through said trap for operating said plug in opening and closing said waste pipe, and means connected to said rod for raising and lowering the same and said plug.

6. The combination with a wash-stand or other hollow plumbing fixture having an opening therein, of a waste pipe connected to said opening, a supply pipe connected to said waste pipe, a trap connected to said waste pipe for the discharge of the water from the fixture through said waste pipe, a plug within said pipe having a rod connected thereto and passing through said trap for operating said plug in opening and closing said waste pipe, and means for sealing the opening for said rod.

7. The combination with a wash-stand or other hollow plumbing fixture having an opening therein, of a waste pipe connected to said opening, a supply pipe connected to said waste pipe, a trap connected to said waste pipe for the discharge of the water from the fixture through said waste pipe, a plug within said pipe having a rod connected thereto and passing through said trap for operating said plug in opening and closing said waste pipe, and a pipe around said rod and adapted to be sealed in said trap.

8. The combination with a wash-stand or other hollow plumbing fixture having an opening therein, of a waste pipe connected to said opening, a supply pipe connected to said waste pipe, a trap connected to said waste pipe for the discharge of the water from the fixture through said waste pipe, a plug within said pipe having a rod connected thereto and passing through said trap for operating said plug in opening and closing said waste pipe, a pipe around said rod and connected to said trap, and means within said trap for sealing said last named pipe.

9. The combination with a wash-stand or other hollow plumbing fixture having an opening therein, of a waste pipe connected to said opening, a supply pipe connected to said waste pipe, a trap connected to said waste pipe for the discharge of the water from the fixture through said waste pipe, a plug within said pipe having a rod connected thereto and passing through said trap for operating said plug in opening and closing said waste pipe, a pipe around said rod and connected to said trap, and a partition within said trap for forming a seal for said last named pipe.

10. The combination with a wash-stand or other hollow plumbing fixture having an opening therein, of a waste pipe connected to said opening, a trap connected to said pipe for the discharge of the water from the fixture through said waste pipe, and a supply pipe connected to said pipe and passing through said trap.

11. The combination with a wash-stand or other hollow plumbing fixture, a waste pipe connected to the fixture, a trap connected to said pipe, and a pipe connected to said waste pipe and extending into said trap for forming an overflow for said fixture.

12. The combination with a wash-stand or other hollow plumbing fixture, a waste pipe connected to said fixture, a trap connected to said pipe, a plug within said trap for opening and closing the waste pipe, and means within said trap for forming an overflow for said fixture.

13. The combination with a wash-stand or other hollow plumbing fixture, a waste pipe connected to said fixture, a trap connected to said pipe, a plug within said trap for opening and closing the waste pipe, and a pipe connected to said waste pipe and extending into said trap for forming an overflow for said fixture.

14. The combination with a wash-stand or other hollow plumbing fixture having an opening therein, of a waste pipe connected to said opening, a supply pipe connected to said waste pipe, a trap connected to said waste pipe for the discharge of the water from the fixture through said waste pipe, and means within said trap for forming an overflow for said fixture.

15. The combination with a wash-stand or other hollow plumbing fixture having an opening therein, of a waste pipe connected to said opening, a supply pipe connected to said waste pipe, a trap connected to said waste pipe for the discharge of the water from the fixture through said waste pipe, and a pipe connected to said waste pipe and extending into said trap for forming an overflow for said fixture.

16. The combination with a wall, of a wash-stand or other hollow plumbing fixture having an opening therein, a trap within said wall, a waste pipe connected to said opening and to said trap through said wall for the discharge of the water from said fixture through said waste pipe, a supply pipe connected to said waste pipe and to said trap through said wall, and means supported by said trap and extending through said wall for positioning and supporting the fixture.

17. The combination with a wall, of a wash-stand or other hollow plumbing fixture having an opening therein, a trap within said wall, a waste pipe connected to said opening and to said trap through said wall for the discharge of the water from said fixture through said waste pipe, a supply pipe connected to said waste pipe and to said trap through said wall, and a bracket supported by said trap and extending through said wall for engaging with the rim of said fixture to position and support the same.

18. The combination with a wall, of a wash-stand or other hollow plumbing fixture having an opening therein, a trap within said wall, a waste pipe connected to said opening and to said trap through said wall for the discharge of the water from said fixture through said waste pipe, a supply pipe connected to said waste pipe and to said trap through said wall, a bracket supported by said trap and having arms extending through said wall, and lugs on the ends of said arms for engaging with seats in the rim of said fixture to position and support said fixture.

19. The combination with a wall, of a wash-stand or other hollow plumbing fixture having an opening therein, a trap within said wall, a waste pipe connected to said opening and to said trap through said wall for the discharge of the water from said fixture through said waste pipe, a supply pipe connected to said waste pipe and to said trap through said wall, a bracket supported by said trap and having arms extending through said wall, and dovetailed lugs on the ends of said arms for engaging with dovetailed seats in the rim of said fixture to position and support said fixture.

20. The combination with a wash-stand or other hollow plumbing fixture having an opening therein, a trap, a waste pipe connected to said opening for the discharge of the water from said fixture through said waste pipe, a supply pipe connected to said waste pipe and to said trap, and means supported by said trap for positioning and supporting said fixture.

In testimony whereof, I the said JOHN T. COSTELLO have hereunto set my hand.

JOHN T. COSTELLO.

Witnesses:
JAMES L. WEHN,
J. N. COOKE.